United States Patent
Kim

(10) Patent No.: US 9,973,428 B2
(45) Date of Patent: May 15, 2018

(54) METHOD FOR CHECKING IP ADDRESS COLLISION OF ETHERNET COMMUNICATION MODULE OF PLC

(71) Applicant: LSIS CO., LTD., Anyang-si, Gyeonggi-do (KR)

(72) Inventor: Hyung Lae Kim, Cheonan (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 138 days.

(21) Appl. No.: 15/006,983

(22) Filed: Jan. 26, 2016

(65) Prior Publication Data
US 2016/0269358 A1 Sep. 15, 2016

(30) Foreign Application Priority Data
Mar. 10, 2015 (KR) .......................... 10-2015-0033357

(51) Int. Cl.
*G06F 15/16* (2006.01)
*H04L 12/741* (2013.01)
*H04L 29/12* (2006.01)

(52) U.S. Cl.
CPC .......... *H04L 45/745* (2013.01); *H04L 61/103* (2013.01); *H04L 61/2046* (2013.01); *H04L 61/6022* (2013.01)

(58) Field of Classification Search
CPC . H04L 45/745; H04L 61/2046; H04L 61/103; H04L 61/6022
See application file for complete search history.

(56) References Cited

U.S. PATENT DOCUMENTS

| | | | | |
|---|---|---|---|---|
| 5,229,988 A * | 7/1993 | Marbaker | ............... | H04L 43/00 340/9.14 |
| 5,708,654 A * | 1/1998 | Arndt | ................ | H04L 29/12009 370/242 |
| 7,234,163 B1 * | 6/2007 | Rayes | ............... | H04L 29/12009 713/154 |
| 9,612,645 B2 * | 4/2017 | Kimura | .................... | G06F 1/324 |
| 2002/0075836 A1 * | 6/2002 | Uematsu | ........... | H04L 29/12216 370/338 |
| 2002/0112076 A1 * | 8/2002 | Rueda | ..................... | H04L 12/14 709/245 |
| 2005/0007962 A1 * | 1/2005 | Nam | .................. | H04L 29/12018 370/252 |
| 2005/0198242 A1 * | 9/2005 | Kim | ....................... | H04L 43/028 709/223 |
| 2005/0265354 A1 * | 12/2005 | Ryu | .................. | H04L 29/12009 370/395.52 |

(Continued)

*Primary Examiner* — Ricky Ngo
*Assistant Examiner* — Lan Huong Truong
(74) *Attorney, Agent, or Firm* — K&L Gates LLP

(57) ABSTRACT

A method for checking an IP address collision is provided. The method includes: transmitting an ARP (Access Resolution Protocol) request message by setting an IP address of the PLC Ethernet communication module as a destination; receiving an ARP reply message responding to the ARP request message; determining whether an MAC (Media Access Control) address included in the ARP reply message is identical to an MAC address of the PLC Ethernet communication module; and determining that an IP address collision occurs, when the MAC (Media Access Control) address included in the ARP reply message is not identical to the MAC address of the PLC Ethernet communication module.

9 Claims, 4 Drawing Sheets

(56) References Cited

U.S. PATENT DOCUMENTS

| | | | |
|---|---|---|---|
| 2008/0250123 A1* | 10/2008 | Chae | H04L 29/12028 709/220 |
| 2009/0307371 A1* | 12/2009 | Okazaki | H04L 29/12028 709/233 |
| 2010/0118831 A1* | 5/2010 | Chen | H04L 61/2015 370/331 |
| 2012/0112076 A1* | 5/2012 | Rosson | G01N 21/6402 250/361 R |
| 2012/0113970 A1* | 5/2012 | Hamachi | H04L 29/12028 370/338 |

* cited by examiner

METHOD FOR CHECKING IP ADDRESS COLLISION OF ETHERNET COMMUNICATION MODULE OF PLC

CROSS-REFERENCE TO RELATED APPLICATIONS

Pursuant to 35 U.S.C. § 119(a), this application claims the benefit of earlier filing date and right of priority to Korean Patent Application No. 10-2015-0033357, filed on Mar. 10, 2015, the contents of which are all hereby incorporated by reference herein in its entirety.

BACKGROUND

Field of the Disclosure

The present disclosure relates to a method for checking an IP address collision. More particularly, the present disclosure relates to a method for a PLC (Programmable Logic Controller) Ethernet communication module to check IP address collisions occurring in a network.

Discussion of the Related Art

From the past to the present, field bus protocols base on RS-485 or RS-422 have been generally used as industrial communication protocols. However, recently, use of Ethernet-based protocols that are easy to be installed and have fast communication speed is gradually being increased.

Accordingly, the conventional RS-485 or RS-422-based protocols are occasionally change their physical layers to be based on Ethernet and established as new standards.

Among the industrial protocols based on Ethernet, the IP (Internet Protocol) has an advantage of capability to use various upper level applications, because the IP facilitates to interface with the user's PC (Personal Computer).

However, there exist a large number of PLCs and PCs in a network of an industrial field. Therefore, IPs may collide when the PLCs and PCs are connected using internet protocols.

A malfunction occurs where data cannot be normally transmitted, when the IPs collide in the network.

Therefore, researches on methods for checking an IP address collision when IPs collide in a network are required, in order to stably transmit and receive data using Ethernet-based protocols.

SUMMARY OF THE DISCLOSURE

Accordingly, the present disclosure is contrived to solve the foregoing problem of the related art, and an object of the present disclosure is to provide a method for a PLC Ethernet to check IP collisions occurring in a network.

In a general aspect of the present disclosure, there is provided a method for checking an IP address collision of a PLC Ethernet communication module, the method comprising: transmitting an ARP (Access Resolution Protocol) request message by setting an IP address of the PLC Ethernet communication module as a destination; receiving an ARP reply message responding to the ARP request message; determining whether an MAC (Media Access Control) address included in the ARP reply message is identical to an MAC address of the PLC Ethernet communication module; and determining that an IP address collision occurs, when the MAC (Media Access Control) address included in the ARP reply message is not identical to the MAC address of the PLC Ethernet communication module.

In some exemplary embodiments of the present disclosure, the step of transmitting the ARP request message may be performed when a signal requesting for IP address collision check is received or when an interrupt occurs.

In some exemplary embodiments of the present disclosure, the interrupt may be generated by a timer configured to generate an interrupt at an interval of a predetermined period.

In some exemplary embodiments of the present disclosure, the method may further comprise: stopping communication of the PLC Ethernet communication module and warning of the IP address collision, when the IP address collision is determined to occur, as a result of the step of determining that the IP address collision occurs.

In some exemplary embodiments of the present disclosure, the method may further comprise: deleting data included in the ARP reply message stored in an ARP table of the PLC Ethernet communication module, when the IP address collision is determined to occur, as a result of the step of determining that the IP address collision occurs.

In some exemplary embodiments of the present disclosure, the method may further comprise: determining whether the communication is interrupted, when the IP address collision is not determined to occur, as a result of the step of determining that the IP address collision occurs; and reopening the communication, when the IP address collision is not determined to be interrupted.

According to an exemplary embodiment of the present disclosure, the PLC Ethernet module may check whether there is any device having duplicate IP address in a network, before or during the PLC operation.

Therefore, it may be ascertained whether there exists any duplicate IP in the network, and thereby damage or loss of data and network malfunction may be prevented, by warning the user a fact that there is a duplicate IP in the network.

DETAILED DESCRIPTION

Advantages and features of the present disclosure and methods to implement them will now be described more fully hereinafter with reference to exemplary embodiments accompanied by drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The scope of the present disclosure shall be defined only by the scope of claims. The same reference numbers indicate the same components throughout the specification. In the attached figures, the thickness of layers and regions may be exaggerated for clarity.

When it is determined that a detailed description about known function or structure relating to the present disclosure may evade the main point of the present disclosure, the detailed description may be omitted. In addition, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
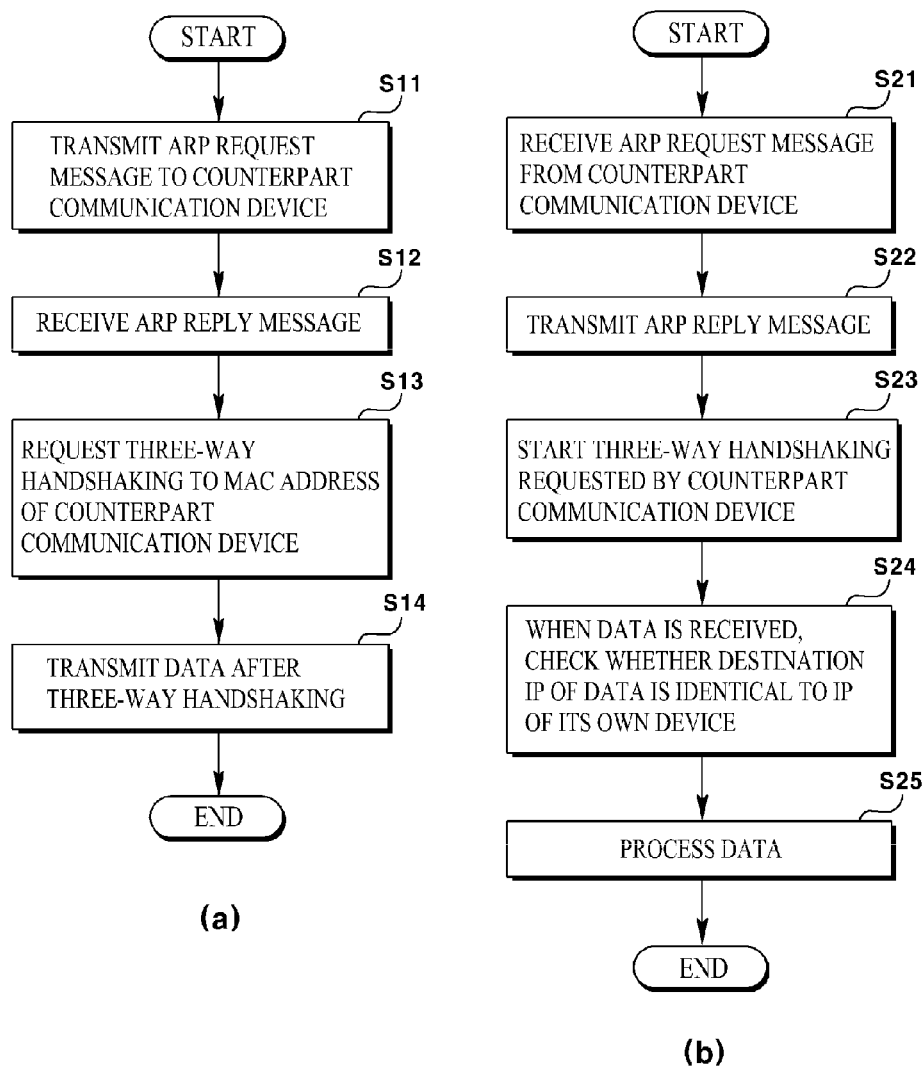
FIG. 1 is a flow chart where a conventional PLC Ethernet communication module transmits and receives data using a TCP (Transmission Control Protocol).

FIG. 1 is a flow chart where a conventional PLC Ethernet communication module transmits and receives data using a TCP (Transmission Control Protocol).

FIG. 1(a) is a flow chart where a conventional PLC Ethernet communication module transmits data using a TCP (Transmission Control Protocol). The PLC Ethernet module transmits an ARP (Address Resolution Protocol) request message to a counterpart communication device (S11), receives an ARP reply message transmitted from the counterpart communication device (S12), and requests a three-way handshaking to an MAC (Media Access Control) address included in the ARP (S13). After the three-way handshaking is completed, TCP layers of the PLC Ethernet communication module transmits data and the counterpart communication device are connected so as to transmit data (S14).

Here, the three-way handshaking is a protocol that is generally used in order to make connections between communication devices. The communication devices become available to communicate.

FIG. 1(b) is a flow chart where a conventional PLC Ethernet communication module receives data using a TCP. The PLC Ethernet module receives an ARP request message from the counterpart communication device (S21), transmits an ARP reply message (S22), and starts a three-way handshaking when the three-way handshaking request is received from the counterpart communication device (S23). When TCP layers of the PLC Ethernet communication module transmits data and the counterpart communication device are connected after the three-way handshaking is completed, the PLC Ethernet communication module receives data from the counterpart communication device and check whether a destination IP of the data is identical to the IP of the PLC Ethernet communication module (S24), and process the data when the destination IP of the data is identical to the IP of the PLC Ethernet communication module (S25).

As another example, the conventional PLC Ethernet communication module transmits and receives data using a UDP (User Datagram Protocol). In such case, the PLC Ethernet communication module broadcasts data without designating IP of the counterpart communication device, receives data transmitted from the counterpart communication device and verifies whether the received data is sent to the PLC Ethernet communication module itself, and processes the data.

On this wise, the conventional PLC Ethernet communication module unilaterally transmits or receives data, and therefore, has a problem in that the conventional PLC Ethernet communication module is incapable of ascertaining by itself even if there is a device having duplicate IP in the network. A malfunction where the data cannot be normally transmitted occurs when IPs collide in the network.

Hence, the present disclosure proposes a method for the PLC Ethernet communication module to check whether there is any device using duplicate IP in the network, periodically or whenever a user wants to check.

Hereinafter, a method for checking IP collision between PLC Ethernet communication modules according to an exemplary embodiment of the present disclosure will be described in detail with reference to enclosed drawings.

Figure 2:
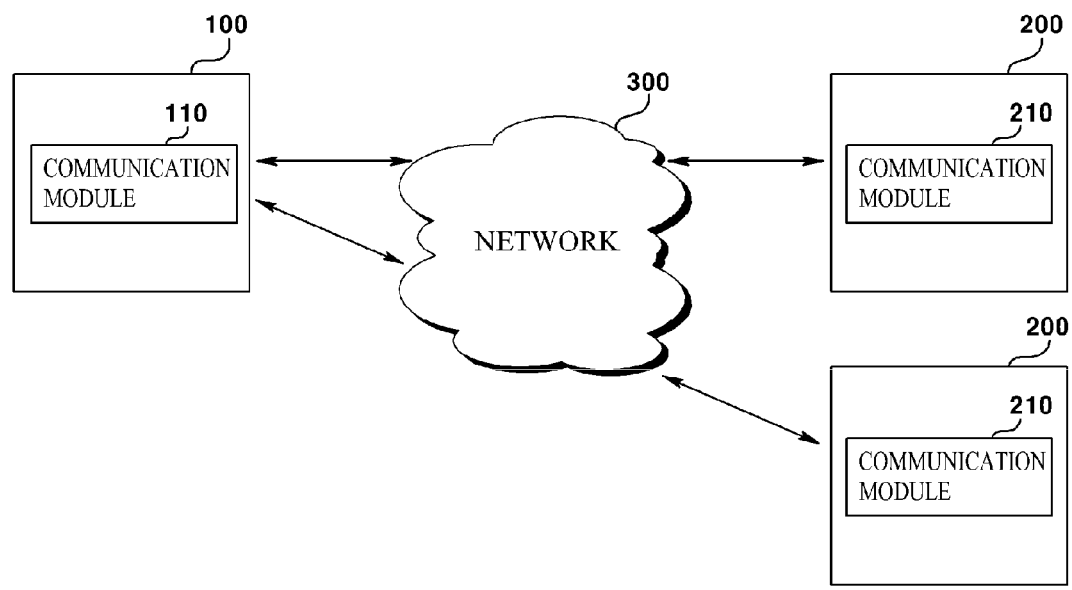
FIG. 2 is a view illustrating an example of a network including a PLC Ethernet communication module having IP collision checking function according to an exemplary embodiment of the present disclosure.

FIG. 2 is a view illustrating an example of a network including a PLC Ethernet communication module having IP collision checking function according to an exemplary embodiment of the present disclosure.

A plurality of communication devices (100, 200) is connected through a network (300). Each of the communication devices (100, 200) may transmit and/or receive data through the network (300).

Hereinafter, an exemplary embodiment of the present disclosure will be described by assuming that the communication device (100) is a device for checking IP collision ('IP collision checking device') and the communication device (200) is a target device to be checked by the IP collision checking device ('IP collision checking target device').

Here, the IP collision checking device (100) and the IP collision checking target device (200) may respectively include a communication module (110, 210) configure to communicate with other communication devices.

For example, the IP collision checking device (100) may be a PLC, the communication modules (110, 210) may be communication modules based on Ethernet ('Ethernet communication module'), and the IP collision checking target device (200) may be all kinds of devices having an IP address.

The communication module (110) of the IP collision checking device (100) may ascertain whether IPs of the IP collision checking target devices (200) collide by a method for checking IP address collision according to an exemplary embodiment of the present disclosure.

Hereinafter, a method for the PLC Ethernet communication module to check IP collision will be described, with reference to the enclosed drawings.

Figure 3:
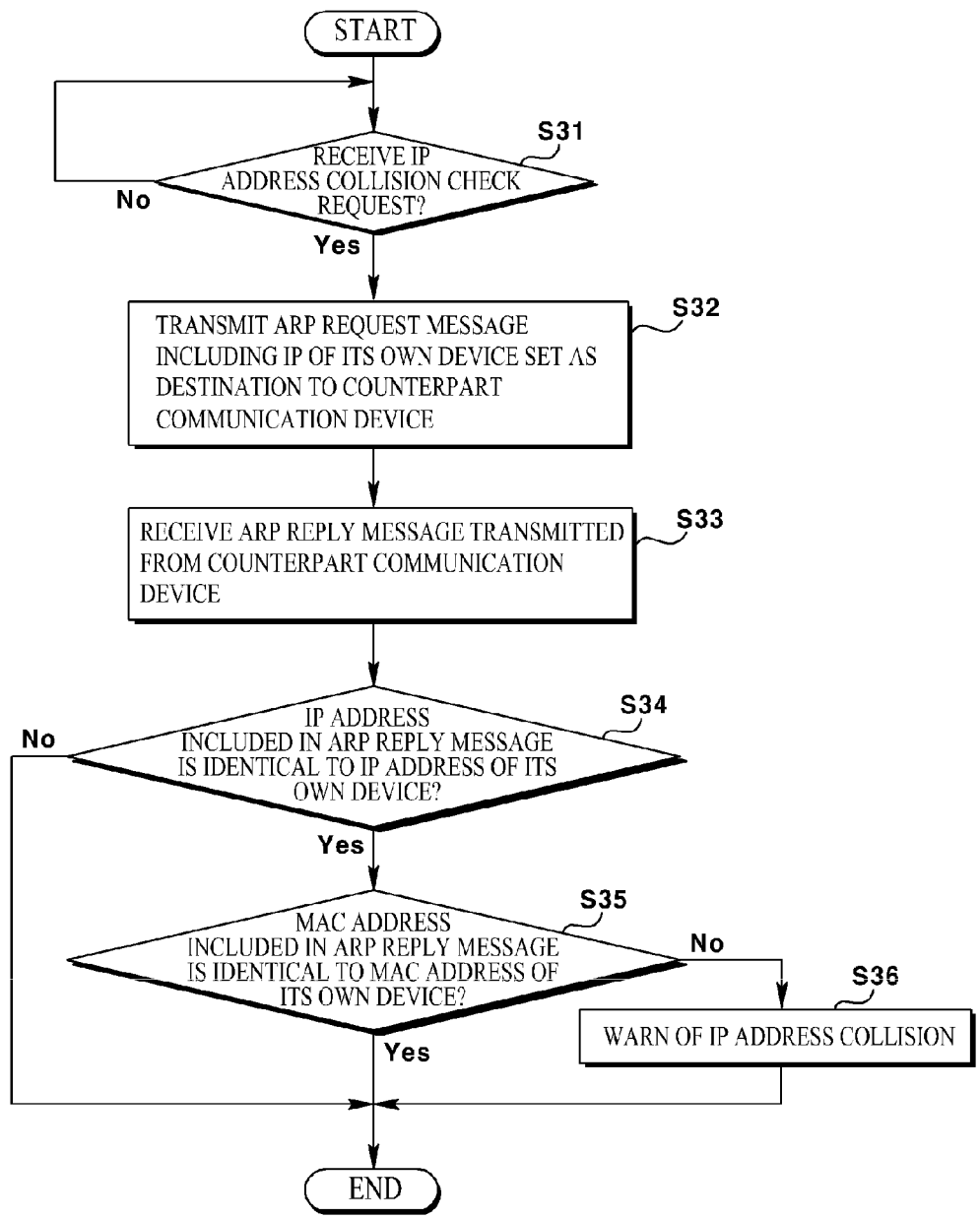
FIG. 3 is a flow chart illustrating a process where a PLC Ethernet communication module checks an IP address collision according to a first exemplary embodiment of the present disclosure.

FIG. 3 is a flow chart illustrating a process where a PLC Ethernet communication module checks an IP address collision according to a first exemplary embodiment of the present disclosure.

Referring to FIG. 3, the communication module (110) determines whether an IP address collision check request is received (S31). When the IP address collision check request is determined to be received (S31—Yes), the communication module (110) transmits an ARP request message including an IP address of the communication module (110) itself set as a destination to the counterpart communication module (210) (S32). Here, the ARP request message is transmitted to all the communication modules (210) connected through the network (300).

After transmitting the ARP request message according to step S32, the communication module (110) receives an ARP reply message transmitted from the counterpart communication module (210) (S33), and checks whether the IP address of the counterpart communication module (210) included in the ARP reply message is identical to the IP address of the communication module (110) itself (S34).

Here, when the IP address of the counterpart communication module (210) is not identical to the IP address of the communication module (110) itself, in a result of the checking in step S34 (S34-No), the communication module (110) determines that an IP address collision does not occur, and finishes checking the IP address collision.

When the IP address of the counterpart communication module (210) is identical to the IP address of the communication module (110) itself, in a result of the checking in step S34 (S34—Yes), the communication module (110) checks whether the MAC address of the counterpart communication module (210) included in the ARP reply message is identical to the MAC address of the communication module (110) itself (S35).

When the MAC address of the counterpart communication module (210) is not identical to the MAC address of the communication module (110) itself, in a result of the checking in step S35 (S35-No), the communication module (110) warns of an IP address collision (S36).

When the IP address of the counterpart communication module (210) is not identical to the IP address of the communication module (110) itself, in a result of the checking in step S34 (S34-No), the communication module (110) determines that an IP address collision does not occur, and finishes checking the IP address collision.

That is, the communication module (110) that has received an IP address collision check request determines that an IP address collision occurs, in a case when the IP address of the counterpart communication module (210) is identical to the IP address of the communication module (110) itself but the MAC address of the counterpart communication module (210) is not identical to the MAC address of the communication module (110) itself.

Here, the flow chart illustrated in FIG. 3 is for a process within a cycle. Such process is performed repeatedly.

Such method for checking IP address collision of the PLC Ethernet communication module according to a first exemplary embodiment of the present disclosure is performed in a case when a request for IP address collision checking is received from the outside. The method may be applied to a case where a worker inputs an initial ID in the PLC and wants to check whether there is any device having an identical IP address.

Figure 4:
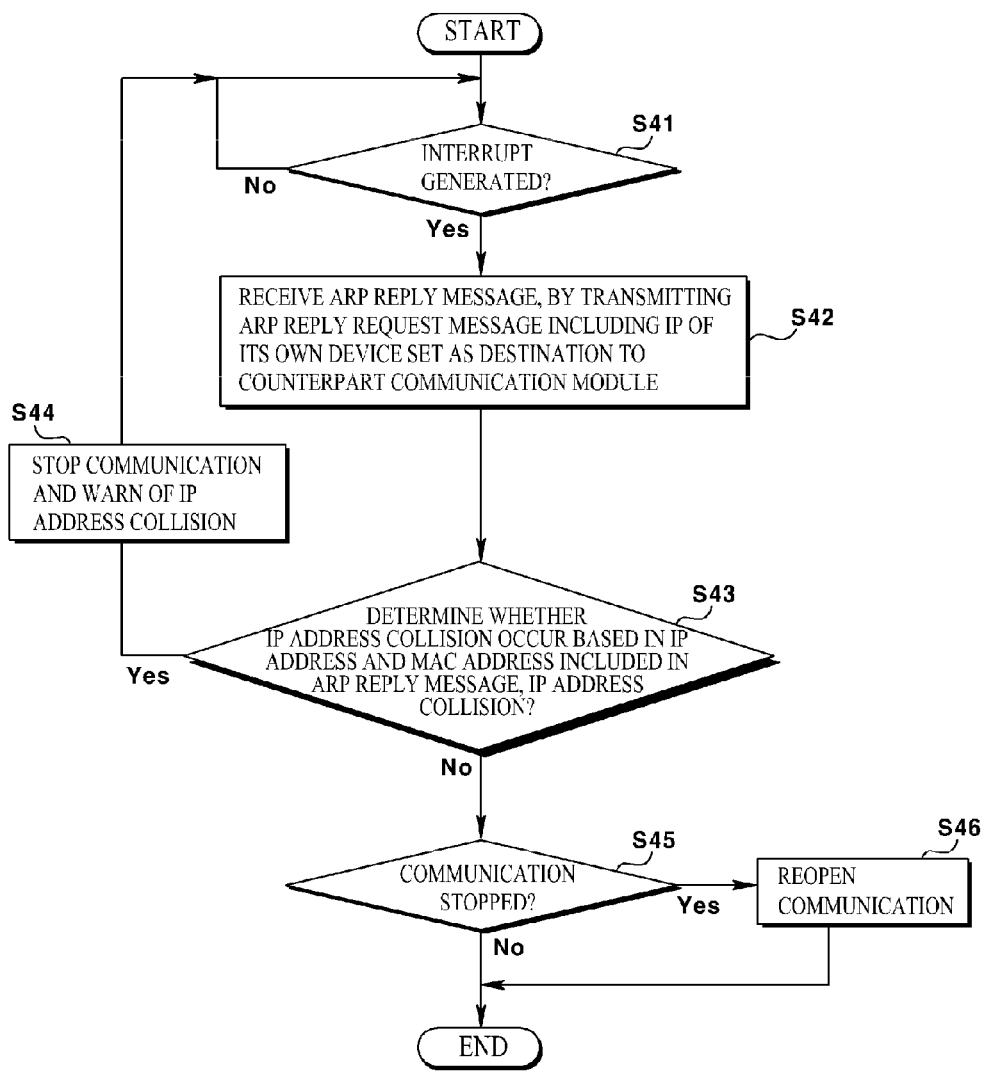
FIG. 4 is a flow chart illustrating a process where a PLC Ethernet communication module checks an IP address collision according to a second exemplary embodiment of the present disclosure.

FIG. 4 is a flow chart illustrating a process where a PLC Ethernet communication module checks an IP address collision according to a second exemplary embodiment of the present disclosure.

Referring to FIG. 4, the communication module (110) determines whether an IP address collision check interrupt occurs (S41). When the IP address collision check interrupt is determined to occur (S41—Yes), the communication module (110) transmits an ARP request message including an IP address of the communication module (110) itself set as a destination to the counterpart communication module (210) and receives an ARP reply message from the counterpart communication module (210) (S42).

For example, the IP address collision check interrupt may be generated by a timer configured to generate an interrupt at an interval of a predetermined period. In addition, the IP address collision check interrupt may be generated when a communication error occurs or when the system is re-operated due to the causes such as power failure. Of course, other various environments where the IP address collision check interrupt is to be generated may be suggested.

In addition, the ARP request message transmitted from the communication module (110) may be transmitted to all the communication modules (210) connected through the network (300).

Meanwhile, when the ARP reply message is received according to step S42, the communication module (110) determines whether an IP collision occurs based on the IP address and MAC address of the counterpart communication module (210) included in the ARP reply message. Here, the IP address and MAC address included in the received ARP reply message are stored in an ARP table.

Here, the communication module (110) determines whether the IP address included in the ARP reply message is identical to the IP address of the communication module (110) itself. When the communication module (110) determines that the IP address included in the ARP reply message is identical to the IP address of the communication module (110) itself, then the communication module (110) determines whether the MAC address included in the ARP reply message is identical to the MAC address of the communication module (110) itself.

In addition, in a case when the communication module (110) determines that the IP address included in the ARP reply message is not identical to the IP address of the communication module (110) itself, the communication module (110) determines that an IP address collision does not occur.

In addition, the communication module (110) determines whether the MAC address included in the ARP reply message is identical to the MAC address of the communication module (110) itself. In a case when the communication module (110) determines that the MAC address included in the ARP reply message is identical to the MAC address of the communication module (110) itself, the communication module (110) determines that an IP address collision does not occur. Otherwise, the communication module (110) determines that an IP address collision occurs when the MAC address included in the ARP reply message is not identical to the MAC address of the communication module (110) itself.

Meanwhile, when the communication module (110) determines that an IP address collision occurs, in a result of the checking in step S43 (S43—Yes), the communication module (110) stops the communication (S44), and proceeds to step S41 to determine whether an IP address collision check interrupt is generated.

Here, the step of stopping the communication (S44) may include warning of an IP address collision. The IP address collision may include a visual waring through a display unit and/or an auditory warning through an audible device.

In addition, a step of deleting all IP addresses and MAC addresses that are data included in the ARP reply message stored in the ARP table may be included, before proceeding to step S41 after stopping the communication of the PLC according to step S44.

Meanwhile, when the communication module (110) determines that an IP address collision does not occur, in a result of the checking in step S43 (S43-No), the communication module (110) determines whether the communication is stopped (S45).

When the communication module (110) determines that the communication is stopped, in a result of the determination in step S45 (S45—Yes), the communication module (110) reopens the communication (S46).

When the communication module (110) determines that the communication is not stopped, in a result of the determination in step S45 (S45-No), the communication module (110) finishes the IP address collision check.

Here, the flow chart illustrated in FIG. 4 is for a process within a cycle. Such process is performed repeatedly.

Such method for checking IP address collision of the PLC Ethernet communication module according to a second exemplary embodiment of the present disclosure is performed in a case when an IP address collision check interrupt is set. The method may be applied to a case where a worker wants to check whether there is any device having an identical IP address during operation of the PLC.

Although a method for checking IP address collision of a PLC Ethernet communication module according to the present disclosure have been described according to a number of exemplary embodiments thereof, it should be understood that numerous other modifications and alternative embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

Therefore, the abovementioned exemplary embodiments and enclosed drawings are intended to be illustrative, and not to limit the scope of the claims. The scope of protection of the present disclosure is to be interpreted by the following claims, and that all the technical ideas within the equivalent scope of the scope of the present disclosure should be construed as being included.

What is claimed is:

1. A method for determining an IP (Internet Protocol) address collision of a PLC (Programmable Logic Controller) Ethernet communication module, the method comprising:
    determining whether an external request for determination of the IP address collision is received;
    transmitting an ARP (Access Resolution Protocol) request message by setting an IP address of the PLC Ethernet communication module as a destination when the external request is received;
    receiving an ARP response message corresponding to the ARP request message;
    determining whether an IP address included in the ARP response message is identical to the IP address of the PLC Ethernet communication module;
    determining whether a MAC (Media Access Control) address included in the ARP response message is identical to a MAC address of the PLC Ethernet communication module;
    determining that an IP address collision occurs when the MAC address included in the ARP response message is not identical to the MAC address of the PLC Ethernet communication module and the IP address included in the ARP response message is identical to the IP address of the PLC Ethernet communication module; and
    deleting data included in the ARP response message and stored in an ARP table of the PLC Ethernet communication module when it is determined that the IP address collision occurs,
    wherein determining whether the external request for determination of IP address collision is received is performed when it is determined that a device having an IP address identical to the IP address of the PLC Ethernet communication module exists in a network after an initial ID (Identification) is input to the PLC.

2. The method of claim 1, further comprising:
    stopping communication of the PLC Ethernet communication module and warning of the IP address collision when it is determined that the IP address collision occurs.

3. The method of claim 2, further comprising:
    determining whether the communication is interrupted when it is determined the IP address collision has not occurred; and
    re-initiating the communication when it is determined that the IP address collision has not occurred.

4. The method of claim 1, wherein transmitting the ARP request message is performed when a signal requesting IP address collision check is received or when an interrupt occurs.

5. The method of claim 4, wherein the interrupt is generated at a predetermined interval.

6. The method of claim 1, further comprising:
    stopping communication of the PLC Ethernet communication module and warning of the IP address collision when it is determined that the IP address collision occurs.

7. The method of claim 6, further comprising:
    determining whether the communication is interrupted when it is determined the IP address collision has not occurred; and
    re-initiating the communication when it is determined that the IP address collision has not occurred.

8. A method for determining an IP (Internet Protocol) address collision of a PLC (Programmable Logic Controller) Ethernet communication module, the method comprising:
    determining whether an interrupt is generated that checks if a device having an IP address identical to an IP address of the PLC Ethernet communication module exists in a network during PLC operation when an IP address collision checking interrupt is set;
    transmitting an ARP (Access Resolution Protocol) request message by setting the IP address of the PLC Ethernet communication module as a destination when it is determined that the interrupt is generated;
    receiving an ARP response message corresponding to the ARP request message;
    determining whether an IP address included in the ARP response message is identical to the IP address of the PLC Ethernet communication module;
    determining whether a MAC (Media Access Control) address included in the ARP response message is identical to a MAC address included in the PLC Ethernet communication module;
    determining that an IP address collision occurs when the MAC address included in the ARP response message is not identical to the MAC address of the PLC Ethernet communication module and the IP address included in the ARP response message is identical to the IP address of the PLC Ethernet communication module; and
    deleting data included in the ARP reply message and stored in an ARP table of the PLC Ethernet communication module when it is determined that the IP address collision occurs.

9. The method of claim 8, wherein the interrupt is generated a predetermined interval.

* * * * *